United States Patent

Tabayama et al.

Patent Number: 5,551,546
Date of Patent: Sep. 3, 1996

[54] ELECTROMAGNETIC CLUTCH

[75] Inventors: Masashi Tabayama, Obu; Yasuo Tabuchi, Anjo; Junichi Ohguchi, Toyoake, all of Japan

[73] Assignee: Nippondenso Co., Ltd., Kariya, Japan

[21] Appl. No.: 293,248

[22] Filed: Aug. 19, 1994

[30] Foreign Application Priority Data

Aug. 31, 1993 [JP] Japan ................. 5-047306 U
Jun. 15, 1994 [JP] Japan ................. 6-132796

[51] Int. Cl.$^6$ ............................ F16D 27/112
[52] U.S. Cl. .................. 192/84.96; 335/281; 335/296
[58] Field of Search ................ 192/84 C, 84 R, 192/84 A, 84 B; 335/281, 296, 297

[56] References Cited

U.S. PATENT DOCUMENTS

| 2,857,998 | 10/1958 | Harter | 192/84 C |
| 3,425,529 | 2/1969 | Hayashi | 192/84 R |
| 4,704,072 | 11/1987 | Nakajima et al. | 192/84 A X |

FOREIGN PATENT DOCUMENTS

| 62-108633 | 7/1987 | Japan . | |
| 1-83931 | 3/1989 | Japan | 192/84 C |

Primary Examiner—Richard M. Lorence
Attorney, Agent, or Firm—Cushman, Darby & Cushman

[57] ABSTRACT

An electromagnetic clutch has an electromagnetic coil 3, an armature 5, and a rotor 1 of a substantially C-cross section, which is constructed by an outer ring 21 arranged outside of the coil 3, an inner ring 22 arranged inside of the coil 3, and a friction face 23 for connecting the inner and the outer rings 21 and 22. The outer ring has an inner periphery of a reduced diameter located nearer to the friction face, so that a thick wall portion 27 is created at a location adjacent the friction face 23. As a result, the magnetic resistance of the outer ring 21 is reduced at a location adjacent the friction wall 23, thereby increasing the total magnetic force of the magnetic circuit, thereby increasing an engaging face between the rotor and the armature.

3 Claims, 6 Drawing Sheets

ELECTROMAGNETIC CLUTCH

BACKGROUND OF THE INVENTION

1. Field of the Invention

The present invention relates to an electromagnetic clutch for selective transmission of a rotating driving force, which can, for example, be utilized for selective operation of a compressor in an air conditioning system for an automobile.

2. Description of Related Art

Known in the prior art is an electromagnetic clutch which comprises a stator containing therein an electromagnetic coil, a rotor made of a magnetizing material and defining an annular opening into which the stator is inserted so that a free rotation of the rotor is allowed, an armature having a frictional surface facing a frictional surface of the rotor, a hub connected to a rotating machine such as a compressor in a refrigerating circuit for an air conditioning system for an automobile, and plate springs for connecting the armature and the hub for creating a force for holding the armature separate from the rotor so as to obtain a gap between the faced frictional surfaces of the rotor and armature, thereby preventing the rotating movement of the rotor from being transmitted to the hub. When the electromagnetic coil is energized, a closed electromagnetic field is created between the coil, the rotor and the armature, so that the armature is attracted to the rotor, which allows the rotating movement of the rotor to be transmitted to the hub.

In the prior art, the rotor has, at its outer periphery adjacent its clutch face, a stepped portion to increase the area of the clutch face, or, if no such stepped portion is provided, the thickness of the outer ring of the rotor is increased. However, these prior arts clutches are not effective for obtaining a desired freedom to select a location to connect a pulley to the rotor, while maintaining a low resistance to the flow of the magnetic flux.

SUMMARY OF THE INVENTION

An object of the present invention is to provide a electromagnetic clutch capable of overcoming the above mentioned drawbacks in the prior art.

An object of the present invention is to provide a electromagnetic clutch capable of providing a stepless outer periphery of the rotor, while obtaining a reduced magnetic resistance.

According to the present invention, a electromagnetic clutch is provided comprising:

a stationary electromagnetic coil of substantially tubular shape generating electromagnetic force when electrically energized;

a rotor defining an axis of a rotation and having an outer and an inner ring portions which are radially spaced and of tubular shape, and friction face extending transversely of the rotating axis, the outer and inner rings being at their ends connected to the friction face, so that an annular space is opened axially at a location spaced from the friction face, so that the coil is stored in the annular space, while allowing the rotation of the rotor with respect to the coil;

a pulley connected to an outer periphery of the rotor, the pulley able to receive a rotational movement from a source so as to cause the rotor to be integrally rotated with the pulley, and;

a resiliently held armature made of a magnetizable material which has a friction face extending transversely of said rotating axis, the friction face of the armature being usually spaced from the friction face of the rotor due to the resiliency, the energization of the electromagnetic coil causing the armature to be attracted to the rotor against the resilient force, so that the rotation of the rotor is transmitted to the armature;

the outer ring of the rotor having a constant outer diameter along its entire length;

the outer ring of the rotor having, at its inner surface, a portion at a location adjacent the friction wall, the thickness of the portion being gradually increased toward the friction wall.

DETAILED EXPLANATION OF PREFERRED EMBODIMENTS

Figure 1:
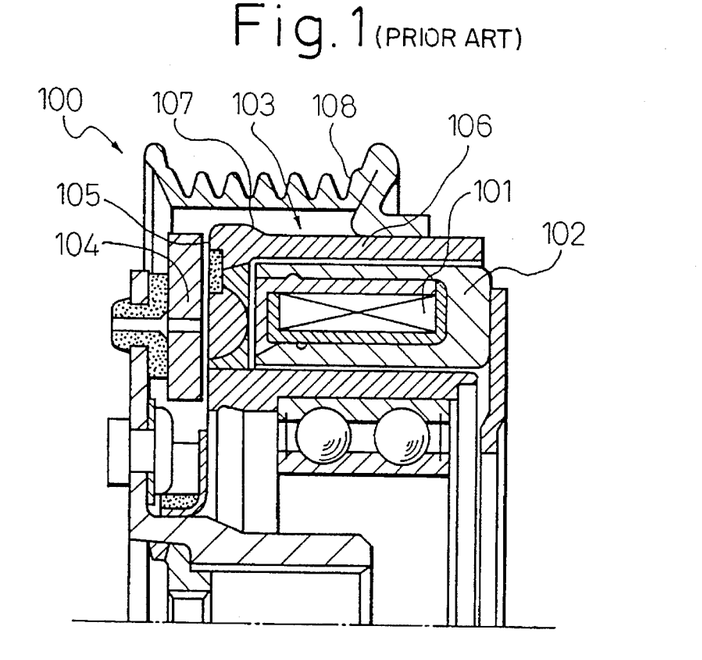
FIG. 1 is a partial cross sectional view of a electromagnetic clutch in the prior art.

The problem to be solved by the present invention will be explained with reference to the drawings. FIG. 1 shows a construction of an electromagnetic clutch in the prior art. In this prior art, the electromagnetic clutch 100 is provided with a stator 102 for storing therein an electromagnetic coil 101 for generating a magnetic flux when energized, an annular rotor 103 of a substantially C cross-sectional shape for covering the stator 102, and an armature 104 which is attracted to the rotor 103 by the magnetic force generated by the electromagnetic coil 101.

In this prior art construction, the rotor 103 has a friction face 105 which engages with the armature 104 and has an outer diameter larger than the outer diameter of an outer ring 106 of the rotor 103 for obtaining an increased area of the friction face with respect to the armature 104. In other words, the outer wall of the rotor 103 has, at a location adjacent the friction face 105, a step portion 107 for creating the increased friction face area.

However, such a provision of the step portion 107 on the outer periphery of the rotor 103 is defective in that, when a pulley 108 for a rotating belt is mounted on the outer periphery of the rotor 103, a limitation arises in a possibility of selection of axial position of the pulley 108 on the rotor 103. Namely, when it is required to obtain a largely overhanged arrangement of the pulley 108 with respect to the armature 104, the existence of the stepped portion 107 limits this possibility due to the fact that a mere slide adjustment of the pulley member 108 on the rotor 103 would cause the pulley member 108 to interfere with the stepped portion 107, thereby preventing the pulley member 108 from being further adjusted. Thus, a new design of the pulley member would be essential to obtain a desired over-hang arrangement.

Figure 2:
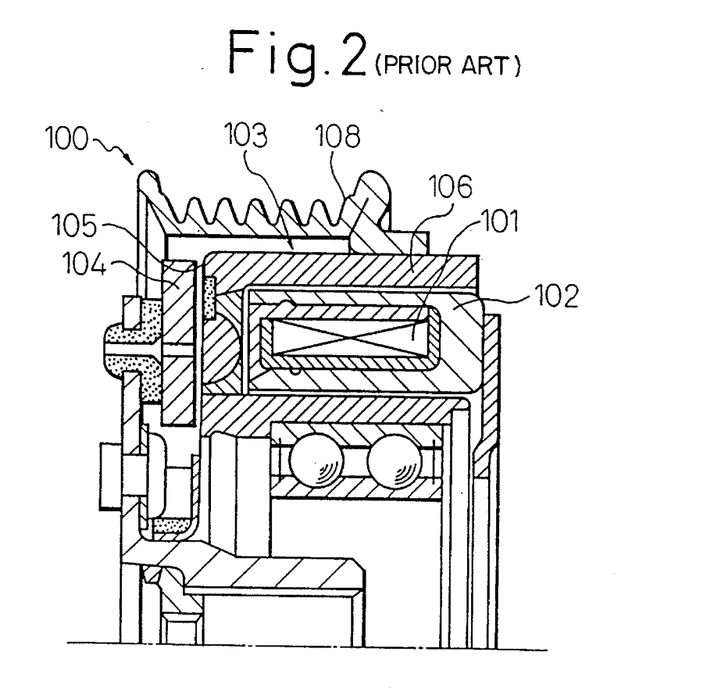
FIG. 2 is similar to FIG. 1 but illustrates another prior art clutch.

FIG. 2 shows another prior art, where the stepped portion 107 in FIG. 1 is eliminated, so that the outer periphery of the rotor 103 is flat along the entire length, so that a position of the pulley 108 on the rotor 103 is not limited. However, this solution causes the thickness of the outer ring 106 of the rotor 103 to be increased, thereby increasing the weight of the rotor 103, i.e., the weight of the clutch. A large weight of the outer ring 106 causes the inertia of the rotor 103 to increase. Furthermore, the increased thickness of the outer ring 106 causes the cost of the material for production of the rotor 103 to increase.

Figure 3:
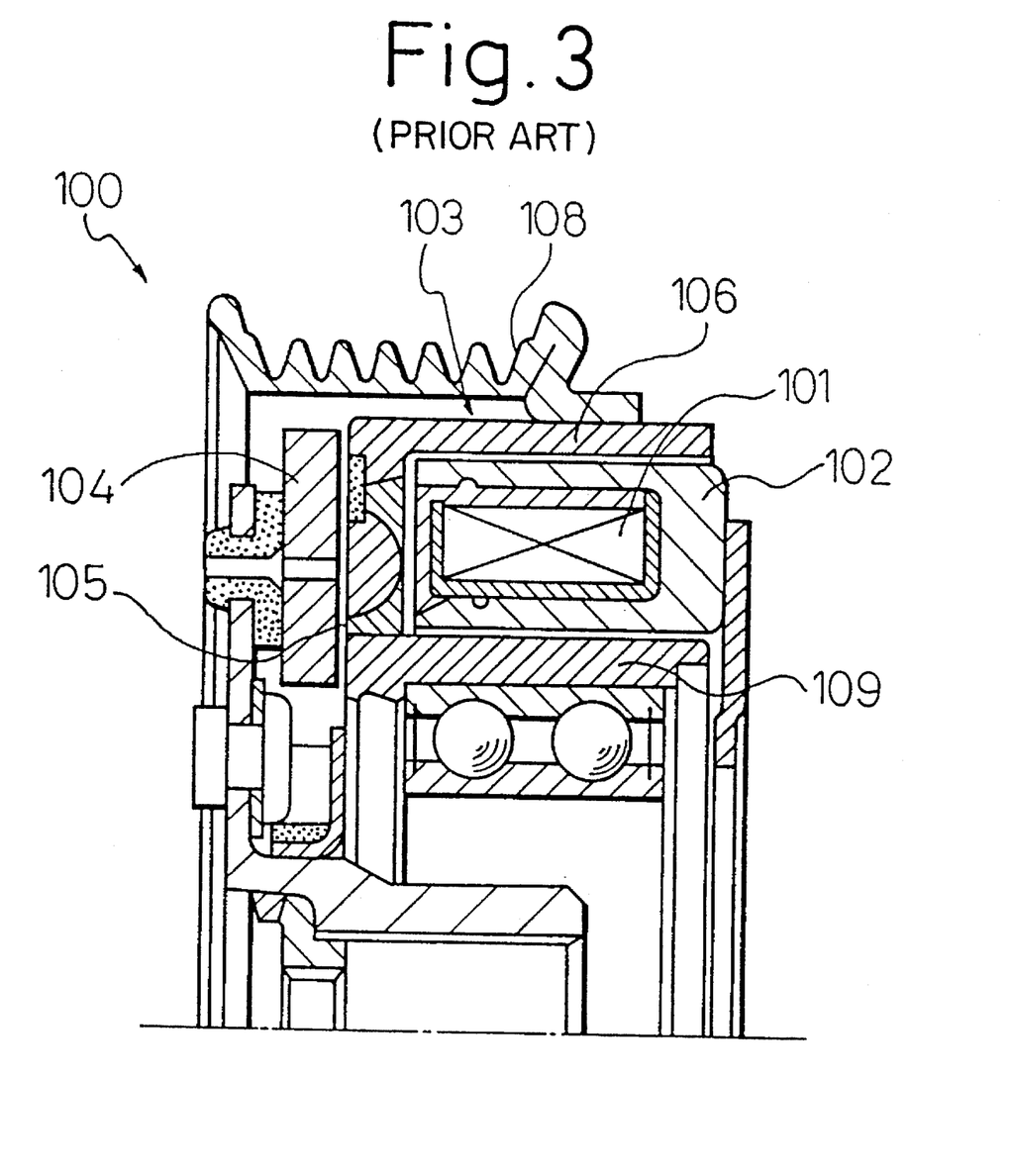
FIG. 3 is similar to FIG. 1 but illustrates still another prior art clutch.

A solution to the above problem is proposed as shown in FIG. 3, wherein the rotor 103 is of a stepless type, and the inner diameter of the outer ring 106 is increased, so that the thickness of the outer ring 106 becomes smaller. As a result, the weight of the outer ring 106 is reduced, while a spacing between the outer ring 106 and the inner ring 109 is increased, so that radial dimension of the electromagnetic coil 101 can be increased. As is well known, the electromagnetic attracting force is the same between electromagnetic coils of the same cross section. Thus, such an increase in the radial dimension of the electromagnetic coil 101 is effective for maintaining the same degree of the electromagnetic attracting force while reducing the axial dimension of the electromagnetic coil 101.

In short, a large radial dimension of the electromagnetic coil 101 allows the axial dimension of the coil 101 to be reduced, resulting in a reduction in the axial dimension of the electromagnetic clutch 100. Furthermore, as far as the stator 102 for covering the electromagnetic coil 101 is concerned, the cross-sectional shape of the coil 101 is closer to a rectangular cross sectional shape, thereby saving the material for producing the stator, thereby reducing the cost and the weight of the stator 102.

However, when the rotor is made without a stepped portion 107 as described above the thickness of the outer ring 106 at a location adjacent the friction wall 105 is reduced by the amount corresponding to the thickness of the stepped portion 107. This reduction results increases the resistance to the magnetic flux at a location on the outer ring 106 adjacent the friction face 105. Such an increase in the resistance in a flow of the magnetic flux at a location on the outer ring 106 adjacent the friction face 105 causes the electromagnetic force of the magnetic circuit to be, as a whole, reduced. Such reduction reduces the attracting force of the armature 104, resulting in a drawback that the engaging force of between the rotor 103 and the armature 104 is reduced.

Now, a construction of an electromagnetic clutch, capable of overcoming the above drawbacks in the prior art, will be explained with reference to the drawings.

First Embodiment

In a first embodiment shown in FIGS. 4 to 7, a reference numeral 1 generally denotes an electromagnetic clutch according to the present invention. The electromagnetic clutch 1 includes, as basic components, a stator 2, an electromagnetic coil 3 stored in the stator 2, a rotor 4 driven in rotation by means of a crankshaft of an internal combustion engine (not shown), an armature 5 attracted to the rotor by means of an electromagnetic force generated by the electromagnetic coil 3, plate springs 6 arranged circumferentially spaced, and an inner hub 7 elastically connected to the armature via the plate springs while the rotating movement from the armature 5 is transmitted integrally to the hub 7.

Figure 4:
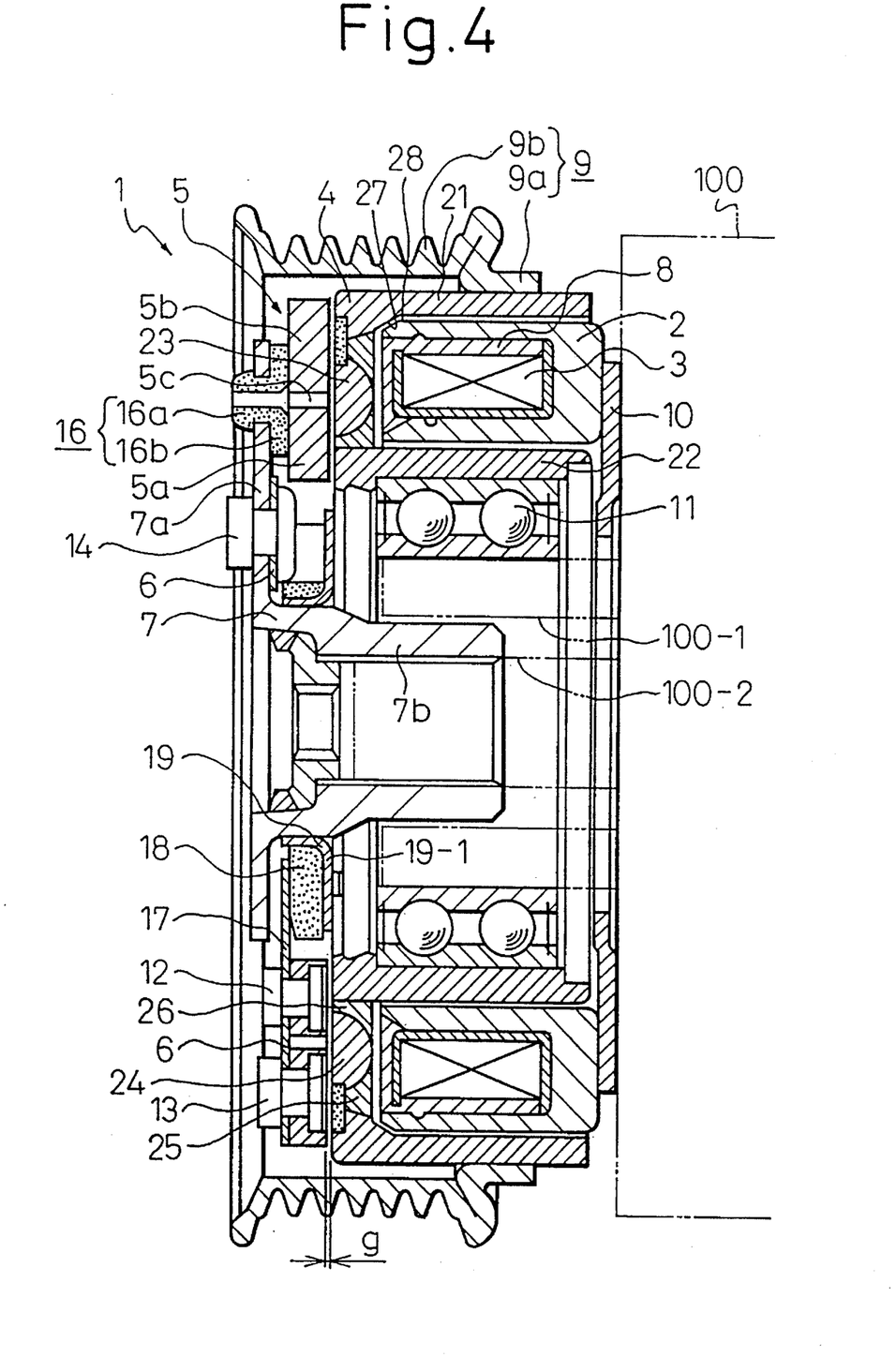
FIG. 4 is a cross-sectional view of an electromagnetic clutch according to the present invention.

The electromagnetic coil 3 is formed as a winding of an electrically conducting wire with an electrically insulating layer. The stator 2 is made of a magnetizable material such as steel and forms a C-cross sectional shape defining an annular recess axially opened, in which the coil 3 is stored. A filler made of an epoxy resin 8 is used for molding the coil 3 in the stator 2. It should be noted that the stator 2 is, at its rear end, connected to a supporting plate 10, of a ring shape, which is connected to a compressor housing 100 which is shown by a phantom line.

A pulley 9 is constructed of a base portion 9a and a pulley portion 9b. The base portion 9a is fixedly connected to an outer ring 21 of the rotor 4 by means of a suitable connecting means such as welding. The pulley portion 9a of a general diameter larger than the base portion 9a extends integrally from the base portion and forms a plurality of V-shaped grooves for receiving corresponding V-shaped belts (not shown) for transmitting the rotational movement of the crankshaft of the internal combustion engine to the rotor 4.

The rotor 4 is made from a magnetizable material, such as steel, and forms, as its cross section, a C-shape for creating a rearwardly opened annular space, to which the stator 2 is inserted, while the rotor 4 is rotated. Arranged inside the rotor 4 is a bearing assembly 11 for rotatably supporting the rotor 4 on an axial extension 100-1 of the housing 100. Construction of the rotor 4 will be explained later.

The armature 5 has a friction face extending transverse to the axis of the rotation and facing a friction face of the rotor 4 while separated by a distance g. The armature 5 forms as a ring shape and is made of a magnetizable material such as steel. The armature 5 is, according to this embodiment, constructed of an inner ring 5a and an outer ring 5b arranged outwardly from the inner ring 5a while an annular gap (a magnetic flux separation groove 5c) is created between the inner and outer rings 5a and 5b, and of plate springs 6 for connecting the inner and outer rings 5a and 5b by rivets 12 and 13, respectively.

The inner hub 7 is constructed of a flange portion 7a and a sleeve portion 7b, which are integral with each other. The sleeve portion 7b is in a splined engagement with a input shaft 100-2 of the refrigerant compressor, so that the rotational movement of the inner hub 7 is transmitted to the compressor. Connected to the flange portion 7a by rivets 14 are inner ends of the plate springs 6, so that an axially resilient connection of the armature 5 with respect to the hub 7 is realized due to the resiliency of the plate springs 6, while the armature 5 is rotated together with the hub 7. The resiliency of the springs 6 are such that the armature 5 is spaced from the rotor 4.

The flange portion 7a of the hub 7 has, along its circumferential direction, a plurality of openings into which stopper cushion members 16, made of resilient material such as a rubber, are press fitted, respectively. The stopper cushion member 16 is, as shown in FIG. 4, constructed of a sleeve portion 16a inserted to the corresponding opening in the flange portion 7a of the hub 7 and a flange portion 16b extending radially and integrally from the sleeve portion 16.

The flange portion 16b of the stopper cushion 16 is arranged between the faced surfaces of the flange portion 7a of the hub 7 and the armature 5, so that the gap g between the faced friction surfaces of the rotor 4 and the armature 5 is maintained to a predetermined value, for example, 0.5 mm, when the electromagnetic coil 3 is de-energized.

The plate spring 6 is integrally formed with an inwardly extending arm portion 17 at a location inward of the rivet 12 for connection of the corresponding plate spring 6 with the armature 5. The arm portion 17 has a resiliency and extends radially inwardly to contact a sleeve 18 made of a resilient material. A spring support member 19 is inserted to the hub 7 and fixed thereto by suitably means such as welding. The spring sleeve 18 is fitted to the support member 19, so that the support member 19 is held between a flange portion 19-1 of the support member 19 and the arm portions 17 of the respective plate springs 6. When the armature 5 is attracted to the rotor 4 when the electromagnetic coil 3 is energized, the arm portions 17 press the elastic member 18, so that a force opposing the movement of the armature 5 toward the rotor 4 is created, thereby reducing the noise generated when the armature 5 is attracted to the rotor 4.

The construction of the rotor 4 according to the present invention will now be explained. The rotor 4 according to the present invention is made by machining a magnetizable metal material. The rotor 4 is constructed of a tubular outer ring 21 located outward of the electromagnetic coil 3, a tubular inner ring 22 located inward of the electromagnetic coil 3, and friction face 23 extending radially for connecting the outer and inner rings 21 and 22 with each other, so as to provide an annular space opened axially on its one end for storing therein the coil 3.

The friction face 23 (FIG. 5) is constructed of a central portion 24 made of a magnetizable material and magnetic flux shield portions 25 and 26 which are separated inwardly and outwardly by means of the central portion 24. The central portion 24 forms, along its cross section, substantially, a semicircular shape having an arc which is located adjacent the electromagnetic coil 3. The magnetic shield portions 25 and 26 for connecting the central portion 24 with the inner ring 22 and the outer ring 21, respectively are made of non-magnetizable material such as a cooper, so that a closed flow of the magnetic flux is prevented from being created between the inner ring 22 and the central portion 24 of the friction wall 23 as well as between the outer ring 21 and the central portion 24 of the friction wall 23. As a result, when the electromagnetic coil 3 is energized, a closed loop of the magnetic flux as shown by a phantom line in FIG. 5 is created in the order of stator 2, the outer ring 21 of the rotor 4, the outer ring 5b of the armature 5, the central portion 24 of the friction face of the rotor 4, the inner ring 5a of the armature 5, the inner ring 22 of the rotor 4, and the stator 2.

Figure 5:
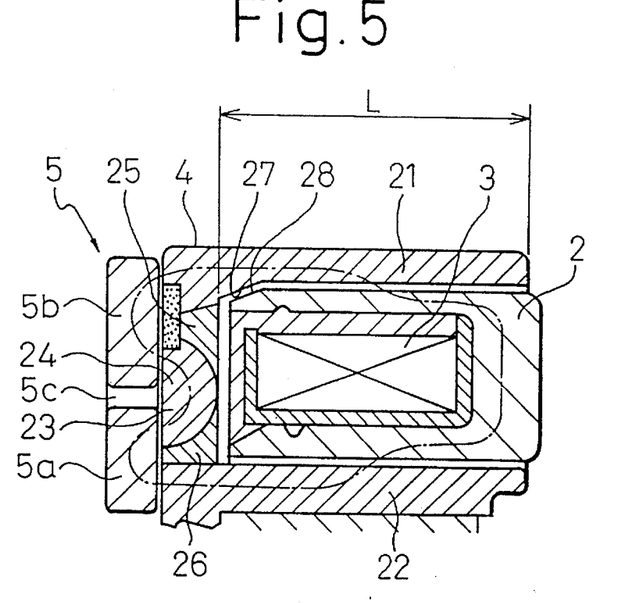
FIG. 5 is an enlarged partial view of FIG. 4, which illustrates how a closed loop of the magnetic flux is created.

According to the present invention, as shown in FIG. 5, the outer diameter of the outer ring 21 of the rotor 4 has a constant value along its entire axial length, which avoids a limitation on the fixed location of the pulley 9 on the rotor 4. Contrary to this, the inner diameter of at the outer ring 21 at a location adjacent the friction face portion 23 of the rotor 4 is gradually reduced, so that the outer ring 21 forms a portion 27 of an increased thickness of an axial length x at the location where the outer ring 21 is connected to the friction wall portion 23. According to the embodiment of the present invention, such a thickened portion 27 is created by the shape of inner surface of the outer ring 21 which is, in the cross-section, an inclined straight line with respect to the longitudinal axis.

Figure 6:
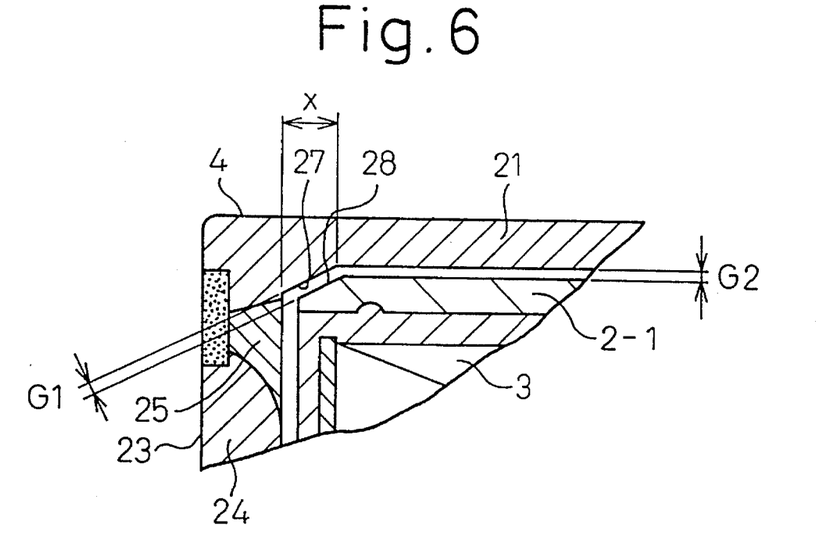
FIG. 6 is an enlarged partial view of FIG. 5, which illustrates how the thickened portion of the outer ring of the rotor is constructed.

The stator 2 has an outer ring portion 2-1, which is, as shown in FIG. 6, of a constant outer diameter except for a location facing the thickened portion 27 of the outer ring 21 of the rotor, so that a constant gap $G_2$ is created between the inner and outer surfaces of the rotor and the stator at any location other than that adjacent the frictional wall portion 23 of the rotor 4. Contrary to this, at the portion of the outer ring 2-1 of the stator 2 faced with the thickened portion 27, the diameter of the outer ring 2-1 is gradually reduced, so that a thinned portion 28 is created. The thinned portion 28 is created by a shape of outer surface of the outer ring 2-1, which is, in the cross-section, an inclined straight line with respect to the longitudinal axis which is complimentary with the inclined straight line of the inner surface of the outer ring 21 of the rotor. As a result, an annular gap $G_1$ of a constant thickness is created between the thick portion 28 of the outer ring 21 of the rotor 4 and the thin portion 28 of the outer ring 2-1 of the stator 3.

The gap $G_1$ thus created between the thick and thin portions 27 and 28 has a value which is larger than the value of the gap $G_2$ between the constant wall thickness portions of the outer rings 21 and 2-1 of the rotor 4 and the stator 3. Such a relationship of the dimensions of the gaps $G_1$ and $G_2$ is effective for preventing the rotor 4 from contacting the stator 4 due to a slight axial movement of the rotor 4 occurred by slight play in the bearing 11, on one hand, and due to dimensional errors generated when molding the thick portion 27 and the opposite portion 28.

Now, a value of the length x of the thick portion 27 of the outer ring 21 of the rotor 4 will be explained with reference to FIG. 6. According to the present invention, it is desirable that the value of the length x of the thick portion 27 is within a range between one tenth to one third of the total axial length L of the outer ring 2

$$\left( \frac{L}{10} \leq x \leq \frac{L}{3} \right).$$

According to the embodiment, the axial length x of the thick portion 27 is one fifth of the axial length of the outer ring 21 of the rotor (x=L/5). It should be noted that the clutch 100 shown in FIG. 3 in the prior art is considered that the length x of the "thick portion" is zero (x=0).

Figure 7:
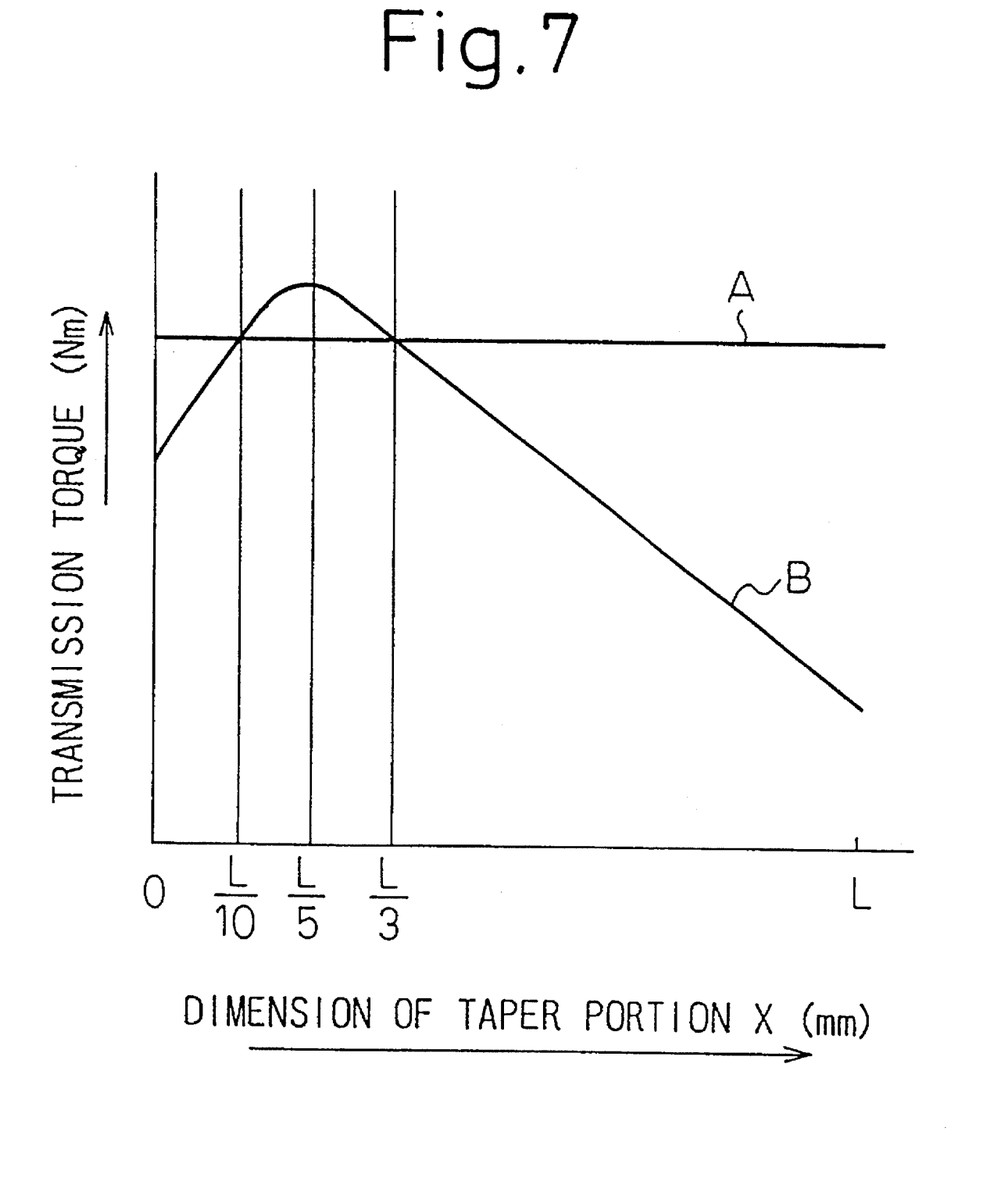
FIG. 7 shows the relationship between the length of the thick or tapered portion of the outer ring of the rotor and the transmitted torque.

Now, a reason of an arrangement of the axial length x in the above rang $$\left( \frac{L}{10} \leq x \leq \frac{L}{3} \right)$$

will be explained by reference to FIG. 7. In FIG. 7, a curve A is a transmission torque of the prior art clutch as shown in FIG. 1 where the rotor 103 is provided with the stepped portion 107 at its outer periphery and with no thick portion at its inner periphery. A curve B is a transmission torque of the clutch according to the present invention when the axial length x of the thick portion 27 at the inner periphery is varied. As understood from FIG. 7, the value of the transmission torque of the clutch according to the present invention B is larger than that of the clutch in the prior art A when the axial length x of the thick portion 27 is in a range between L/10 and L/3. In view of this, the preferred range of the length x of the thick portion 27 is between L/10 and L/3, and the length is the most preferably L/5, which provides the maximum transmission torque.

When the axial length x is smaller than 1/10 of the axial length L of the outer ring 21, i.e., x<L/10, a transmission torque B provided by the thick portion 27 is lower than the transmission torque A in the prior art due to the fact that a contribution of the thick portion 27 to an increase of the thickness of the ring portion at the location adjacent the friction wall 23 is less than a contribution of flattening of the outer ring 21 to a reduction of the thickness of the ring portion at the location adjacent the friction wall 23.

When the axial length x is larger than ⅓ of the axial length L of the outer ring 21, i.e., x>L/3, a transmission torque B according to the present invention is also smaller than that in the prior art, since an increased length of the larger gap $G_1$ causes the magnetic resistance to be increased.

Now, an operation of the present invention will be briefly explained. Namely, when the electromagnetic coil 3 is de-energized, the armature 5 is held in a position spaced from the rotor 4 due to an elastic force of the plate springs 6. As a result, the rotational movement of a crankshaft of an internal combustion engine transmitted to the rotor 4 via the belt (not shown) and the pulley 9 is not transmitted to the armature 5 and the inner sleeve 7, i.e., the compressor. Namely, an idle rotation of the rotor 4 is obtained.

When the electromagnetic coil 3 is energized, a electromagnetic force is generated, which causes the armature 4 to be attracted to the rotor 4, thereby causing the faced friction faces to engage with each other, so that the rotational movement of the rotor 4 is transmitted, via the armature 5 and the hub 7, to the input shaft 100-2 of the compressor.

According to the present invention, the rotor 4 has a constant outer diameter. However, the provision of the thick portion 27 at the inner periphery of the outer ring portion 21 of the rotor at the location adjacent the frictional wall 23 can increase the thickness of the ring portion 21 at this location, thereby reducing the magnetic flow resistance. As a result of the provision of the thick portion 27 for reducing the resistance to the magnetic flux, an increase in the electromagnetic force is obtained, which is effective for increasing the force when the armature 5 is attracted to the rotor 4.

According to the first embodiment, the outer diameter of the outer ring 21 of the rotor 4 has a constant value along the entire axial length of the rotor 4. Thus, any limitation does not exist as to a location of the pulley 9 on the rotor 4. Furthermore, the provision of the thick portion 27 at the location of the inner surface of the outer ring 21 adjacent the frictional wall 23 can generate an electromagnetic force which is larger than the electromagnetic force generated by a rotor having a stepped portion at its outer surface of the outer ring portion of the rotor. In other words, the electromagnetic clutch according to the present invention can produce an electromagnetic force, for attracting the armature and causing it to contact with the rotor, which is larger than the electromagnetic force which is generated by the prior art clutch having the outer stepped portion.

Furthermore, according to the electromagnetic clutch of the present invention, an increase in the electromagnetic force in the magnetic circuit can be obtained, without increasing the electromagnetic force generated by the electromagnetic coil 3 itself. Thus, an effective saving of electric power can be obtained.

Furthermore, in comparison with the prior art clutch with the outer stepped portion as shown in FIG. 1, the rotor 4 according to the present invention can have an increased gap between the outer ring 21 and the inner ring 22, thereby obtaining an increased radial dimension, while reducing an axial dimension of the stator 2 as well as the electromagnetic coil 3. Due to such a reduction in an axial dimension of the stator 2 as well as the electromagnetic coil 3, the axial dimension of the electromagnetic clutch 1 as a whole can also be reduced.

Second Embodiment

Figure 8:
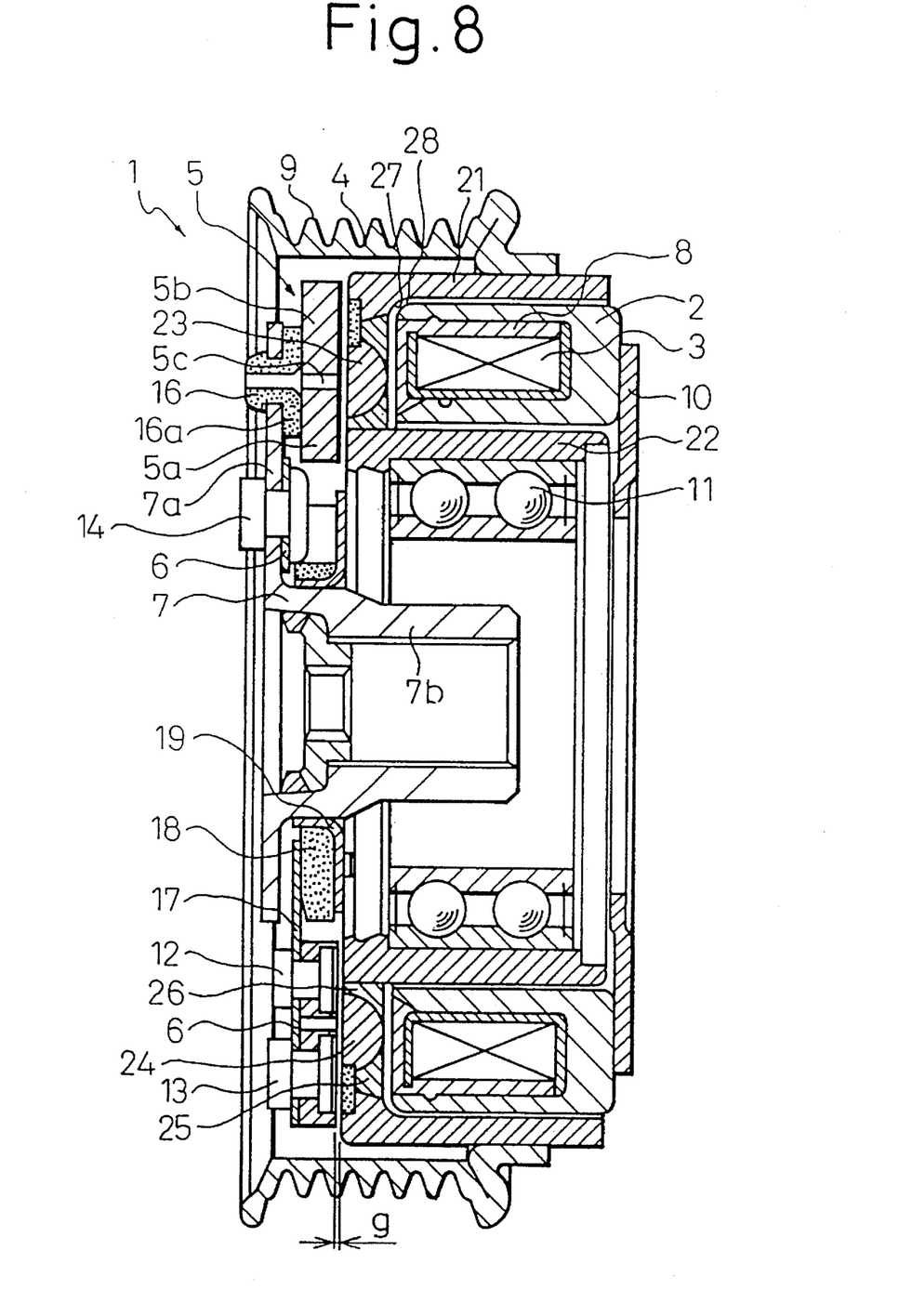
FIG. 8 is similar to FIG. 4 but illustrates a second embodiment of the present invention.

FIG. 8 shows a second embodiment, which features, over the inclined straight line of inner surface of the thick portion 27 in it cross section in the first embodiment, that the inner surface of the thick portion 27 of the rotor 4 forms, in the cross section, a curved line inclined with respect to the longitudinal axis. The stator 2 has an opposite portion 27 which has an outer surface which forms, in its cross section, a curved line which is complimentary to the curved line of the thick portion 27 of the rotor 4.

Modification

The above embodiments are directed to an application to an electromagnetic clutch for a compressor in a refrigerating system for an air conditioning system for an automobile. However, the present invention can be equally applied for a clutch for any appliances wherein selective transmission of a rotating movement is needed, such as a supercharger or automatic transmission for an automobile.

We claim:

1. A four-pole electromagnetic clutch comprising:

a stationary electromagnetic coil of substantially tubular shape generating an electromagnetic force when electrically energized;

a rotor disposed about a rotational axis having an outer ring portion and an inner ring portion, the outer ring portion being concentrically disposed and radially spaced from the inner ring portion, the rotor also having a friction wall disposed substantially perpendicular to the rotational axis between the outer ring portion and the inner ring portion thereby defining an annular space between the outer ring portion, the inner ring portion and the friction wall, the coil being disposed within the annular space such that the rotor is rotatable relative to the coil;

a pulley disposed on an outer periphery of the outer ring portion, the pulley being constructed and arranged to be integrally rotated with the rotor; and an armature made of a magnetic material having an inner portion and an outer portion, the outer portion being concentrically disposed and radially spaced from the inner portion such that an annular gap is defined between the inner portion and the outer portion, the armature also having a friction face laterally spaced from the friction wall, the friction face of the armature being biased away from the friction wall of the rotor when the coil is not energized and the friction face of the armature engaging the friction wall when the coil is energized so that a rotation of the rotor is transmitted to the armature, the outer ring of the rotor having a constant outer diameter, the outer ring of the rotor having a thick portion disposed on an inner surface of the outer ring adjacent to the friction wall, a thickness of the thick portion being gradually and smoothly increased toward the friction face, wherein an axial length x of the thick portion satisfies, with respect to an axial length L of the outer ring, the following equation $$\frac{L}{10} \geqq x \geqq \frac{L}{3}, \text{ and}$$

wherein the outer ring of the rotor, the inner ring of the rotor, the outer portion of the armature, the inner portion of the armature and the friction wall are constructed and arranged such that when the coil is energized a magnetic flux path is created between the outer ring of the rotor, the outer portion of the armature, the friction wall, the inner portion of the armature, and the inner ring of the rotor.

2. An electromagnetic clutch according to claim 1, wherein the thick portion forms, along its axial cross-section, an inclined straight line.

3. An electromagnetic clutch according to claim 1, wherein the thick portion forms, along its axial cross-section, an inclined curved line.

\* \* \* \* \*

UNITED STATES PATENT AND TRADEMARK OFFICE
CERTIFICATE OF CORRECTION

PATENT NO. : 5,551,546
DATED : September 3, 1996
INVENTOR(S) : Tobayama et al

It is certified that error appears in the above-indentified patent and that said Letters Patent is hereby corrected as shown below:

On the title page: Item [19 & 75] the first inventor should read --Masashi Tobayama-- and "Tobayama et al".

Signed and Sealed this

Twenty-ninth Day of April, 1997

Attest:

BRUCE LEHMAN

Attesting Officer

Commissioner of Patents and Trademarks